S. F. SMITH.
COMPUTING AND RECORDING MACHINE.
APPLICATION FILED JUNE 1, 1909.

1,152,664.

Patented Sept. 7, 1915.
6 SHEETS—SHEET 1.

Witnesses:-
F. C. Fliedner
N. B. Keating

Inventor,
Stuart F. Smith
By F. M. Wright,
Attorney

S. F. SMITH.
COMPUTING AND RECORDING MACHINE.
APPLICATION FILED JUNE 1, 1909.

1,152,664.

Patented Sept. 7, 1915.
6 SHEETS—SHEET 2.

Witnesses:-
F. C. Fliedner
N. B. Keating

Inventor,
Stuart F. Smith
By
F. M. Wright,
Attorney

S. F. SMITH.
COMPUTING AND RECORDING MACHINE.
APPLICATION FILED JUNE 1, 1909.

1,152,664.

Patented Sept. 7, 1915.
6 SHEETS—SHEET 3.

Witnesses:—
F. C. Fliedner
N. B. Keating

Inventor
Stuart F. Smith,
By F. M. Wright,
Attorney

S. F. SMITH.
COMPUTING AND RECORDING MACHINE.
APPLICATION FILED JUNE 1, 1909.

1,152,664.

Patented Sept. 7, 1915.
6 SHEETS—SHEET 4.

Witnesses:—

Inventor,
By Stuart F. Smith
F. M. Wright,
Attorney

S. F. SMITH.
COMPUTING AND RECORDING MACHINE.
APPLICATION FILED JUNE 1, 1909.
1,152,664.
Patented Sept. 7, 1915.
6 SHEETS—SHEET 5.
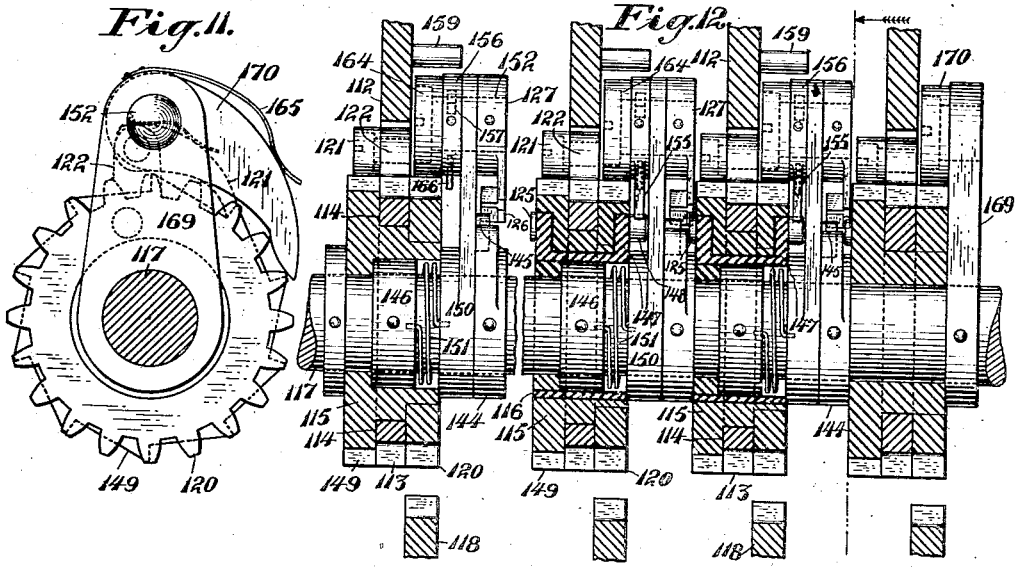
Witnesses:—
F. C. Fliedner
N. B. Keating
Inventor,
Stuart F. Smith
By J. M. Wright,
Attorney

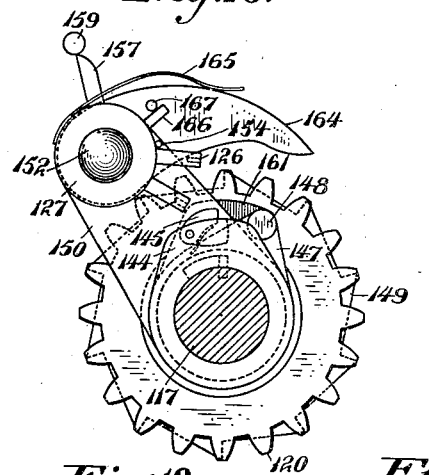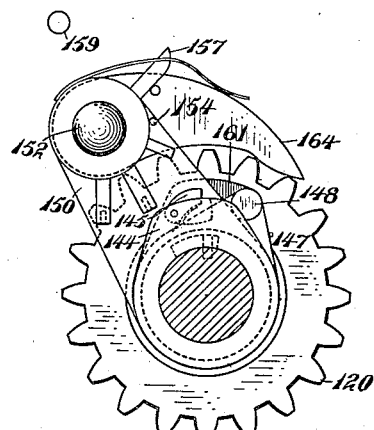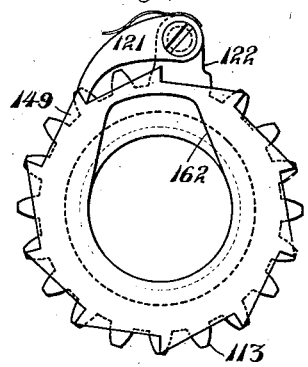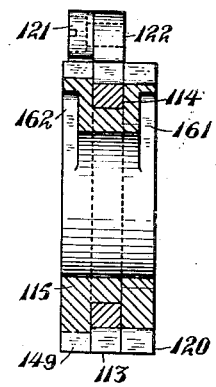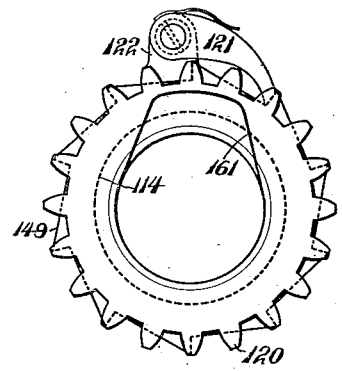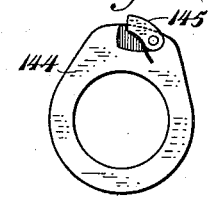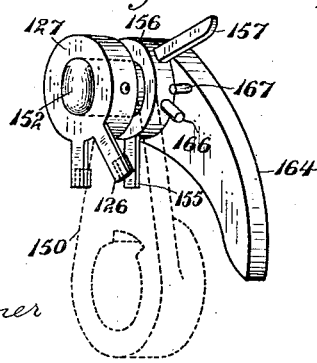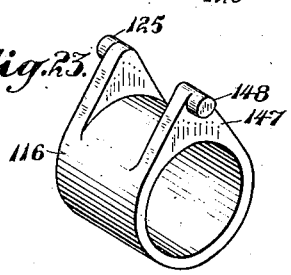

UNITED STATES PATENT OFFICE.

STUART F. SMITH, OF SAN FRANCISCO, CALIFORNIA.

COMPUTING AND RECORDING MACHINE.

1,152,664.   Specification of Letters Patent.   Patented Sept. 7, 1915.

Application filed June 1, 1909. Serial No. 499,450.

*To all whom it may concern:*

Be it known that I, STUART F. SMITH, a citizen of the United States, residing at San Francisco, in the county of San Francisco, and State of California, have invented new and useful Improvements in Computing and Recording Machines, of which the following is a specification.

The object of the present invention is to provide a machine especially adapted to be used in banks and similar institutions by which checks or other documents relating to money may be stamped with the amount paid, or received, thereon, by which a record may be obtained of all the individual sums so paid or received, and by which a separate total may be independently obtained of any desired portion of such payments, or other sums.

The invention also resides in the novel construction, combination and arrangement of parts hereinafter fully specified and particularly pointed out in the claims.

Figure 1:
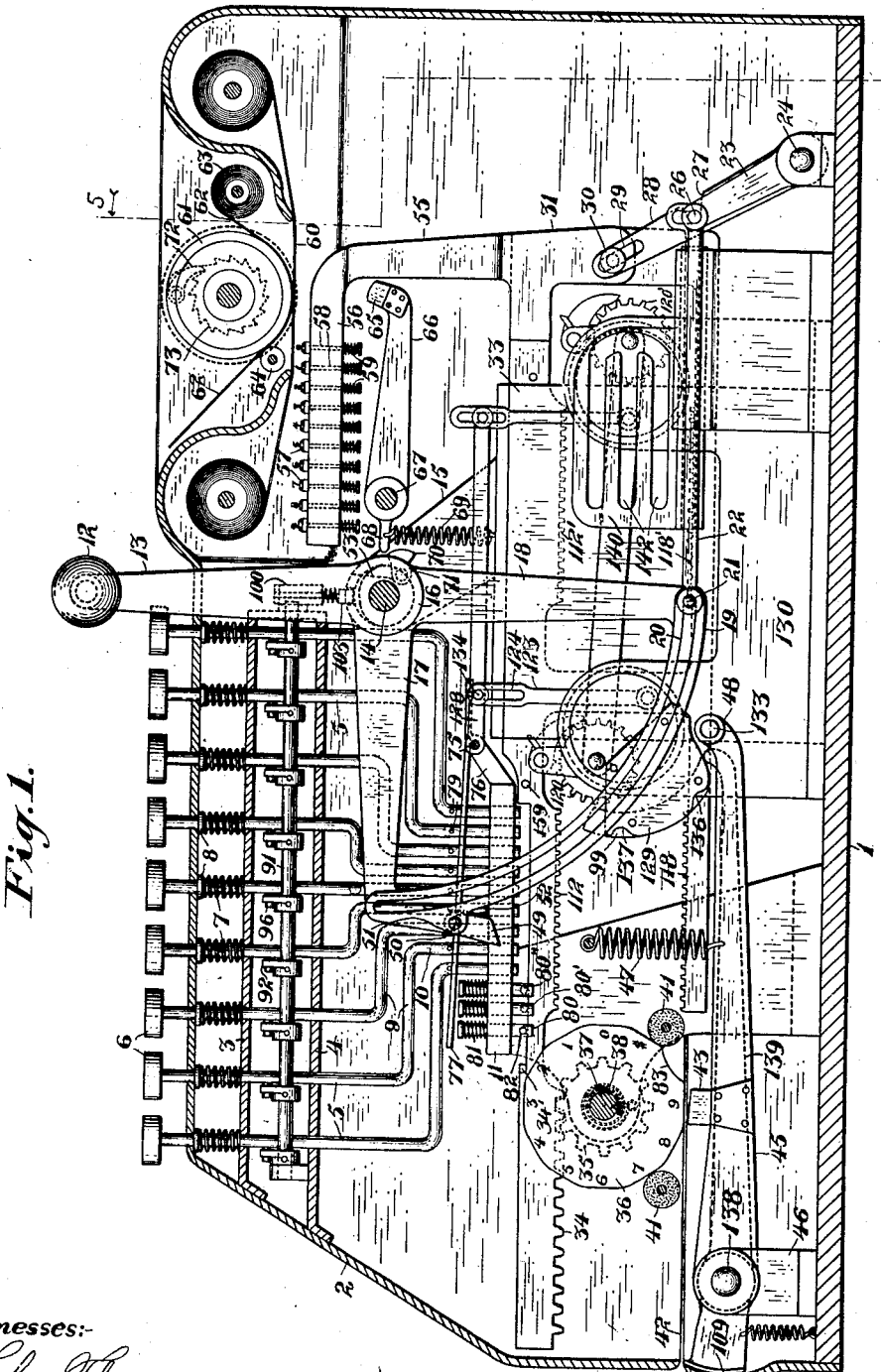
Figure 2:
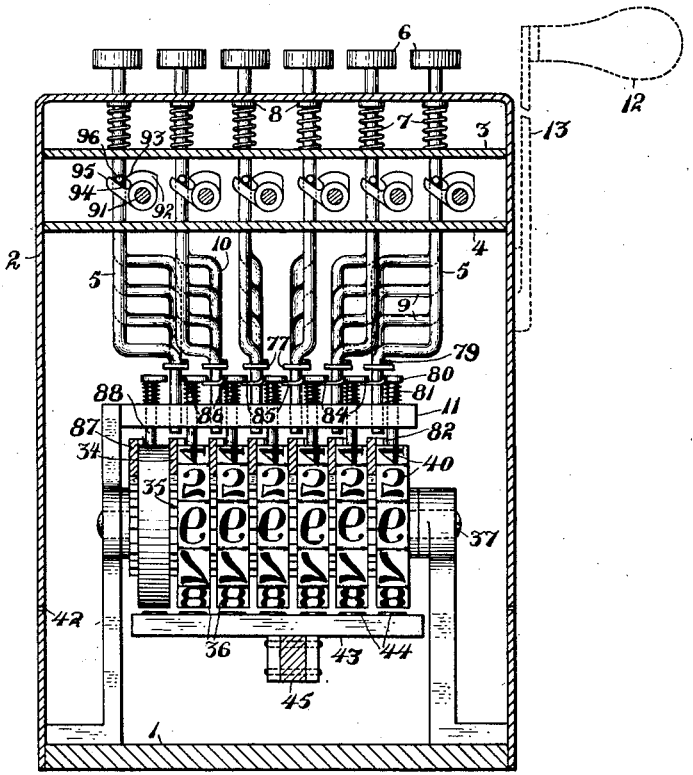
Figure 3:
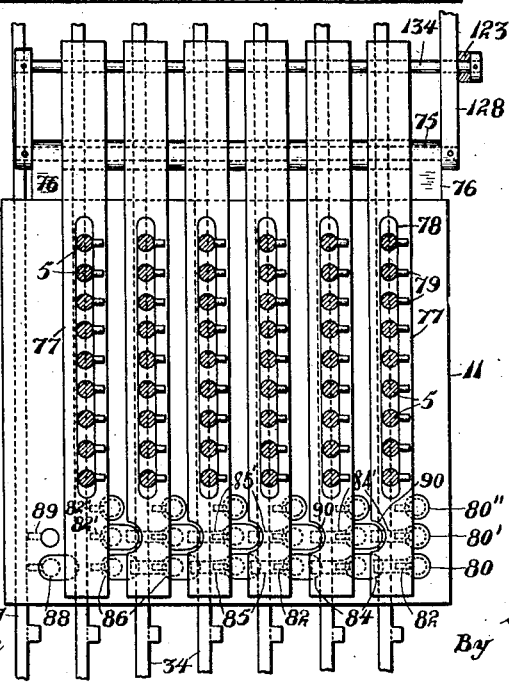
Figure 4:
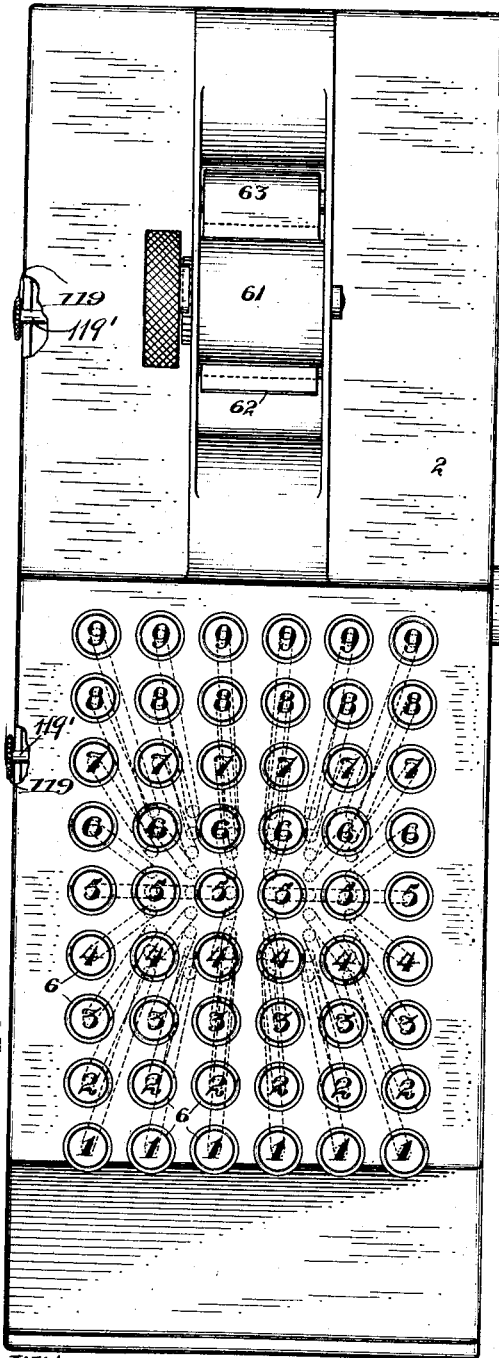
Figure 5:
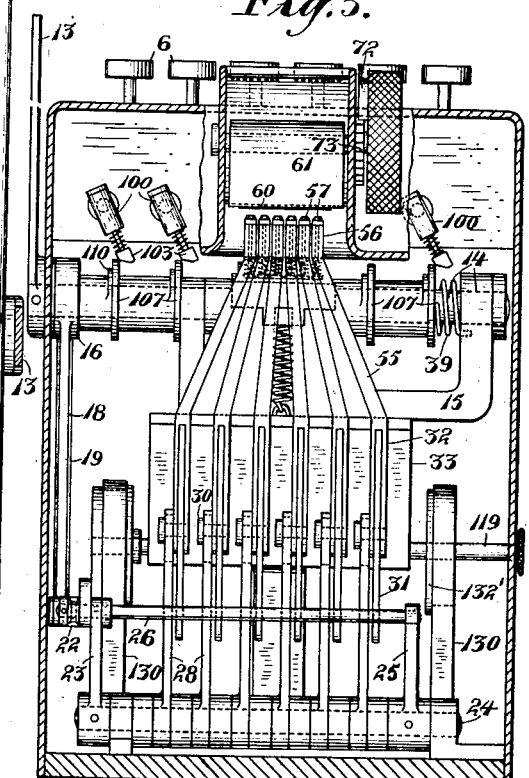
Figures 6, 7:
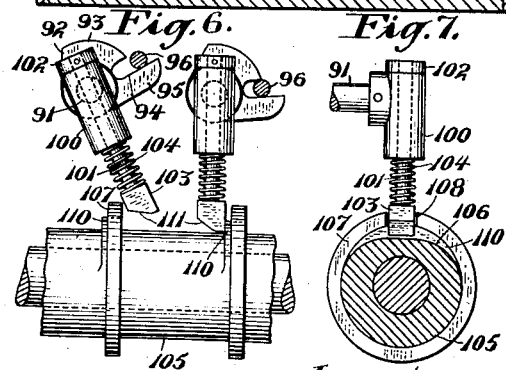
Figure 8:
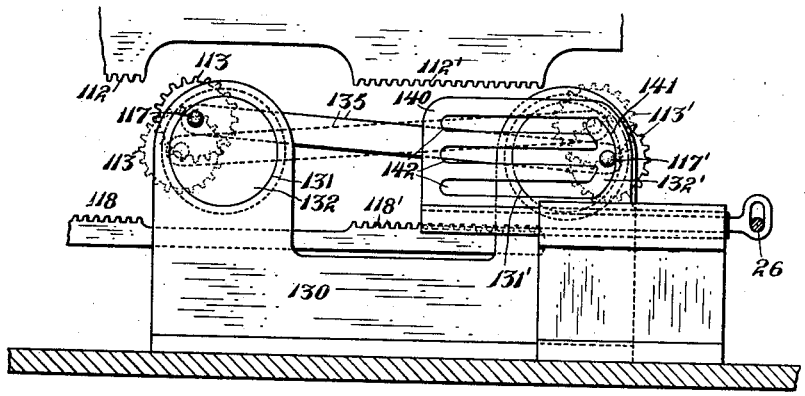
Figure 9:
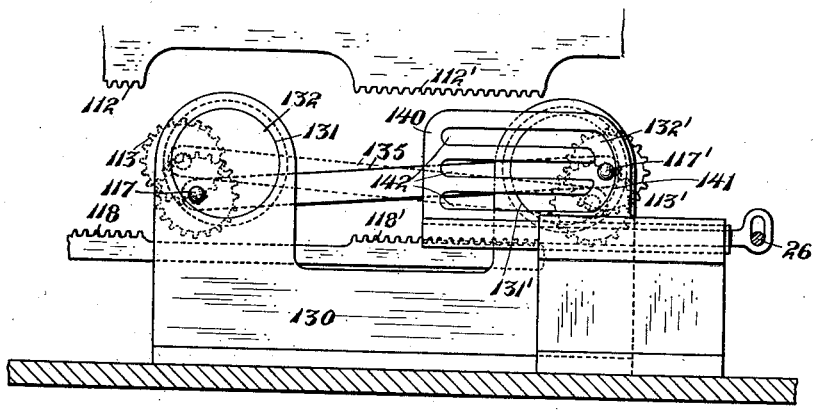
Figure 10:
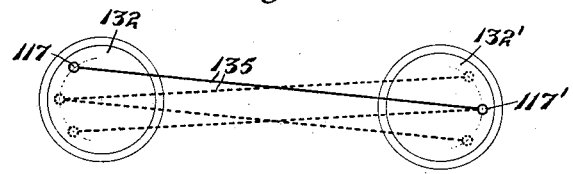

In the accompanying drawings, Figure 1 is a longitudinal section of the apparatus; Fig. 2 is a vertical section near the front end thereof; Fig. 3 is a broken horizontal section on the front portion of the machine; Fig. 4 is a plan view of the machine; Fig. 5 is a vertical section on the line 5—5 of Fig. 1; Fig. 6 is an enlarged detail rear view of the operating mechanism; Fig. 7 is a transverse section through the operating shaft; Fig. 8 is a detail side view showing the bearings for the two series of totalizing wheels and the connection between them; Fig. 9 is a similar view showing the same parts in a different position; Fig. 10 is a diagrammatic view illustrating said connection; Fig. 11 is an enlarged section through a totalizing shaft; Fig. 12 is a broken longitudinal section thereof; Figs. 13, 14, 15, 16 and 17, are views, similar to Fig. 11, showing the parts in different positions; Fig. 18 is a transverse section through totalizing wheels detached; Fig. 19 is a side view of the same; Fig. 20 is a view of the other side of the same; Fig. 21 is a side view of a collar which carries a latch; Fig. 22 is a perspective view, of the sleeves in the end of an arm, the arm itself being omitted; Fig. 23 is a perspective view of an inner sleeve on a totalizing shaft.

Referring to the drawing, 1 indicates a base, and 2 a casing secured thereon, within which casing are contained the operating parts of the machine. 3 indicates an upper, and 4 a lower, guide plate through which plates slide vertically the stems 5 of operating keys 6. These stems and keys may be arranged in any desired number of columns, there being nine keys in each column, numbered in order from "1" to "9." Each key is normally pressed upward by a coiled spring 7 around its stem pressing against a collar 8 on the stem. The lower portions of said stems are bent at right angles, or horizontally, as shown at 9, and then again downward, as shown at 10, they being given this form in order to bring the lower ends of all of the stems of each column close together. Said lower ends pass through holes in a guide plate 11 suitably secured upon the frame.

12 indicates an operating handle on the end of an arm 13, secured to a transverse shaft 14, rotating in bearing 15, said shaft having also secured thereto a collar 16, from which extend two arms 17, 18, connected by a segment 19 formed with an arcuate slot 20. Engaging the slot 20 in said segment 19 is a pin 21 on the end of a link 22 pivotally attached at its rear end to the end of an arm 23 secured to one end of a rock shaft 24 extending across the machine, to the other end of which rock shaft is also secured an arm 25 similar to the arm 23, the outer ends of said arms being connected with each other by a cross bar 26. When the operator actuates the operating handle 12 by moving it downward and toward the front, the arcuate segment in which is formed the slot 20 moves downward and rearward, thereby freeing said link 22, so as to permit said rock shaft 24 to rock and the cross bar 26 to move rearward. Said cross bar 26, in the normal position of the machine, engages recesses 27 formed in the rear edges of arms 28, one for each column, said arms being loose on said rock shaft 24, and having in their outer ends slots 29 engaged by pins 30 carried by slide pieces 31, which can slide in bearings 32 in a frame 33. Each slide piece is formed on the under side of its front end with a rack 34, which engages a gear wheel 35 secured to the side of a recording wheel 36 loose on a fixed transverse shaft 37. Secured to each recording wheel is the outer end of a coiled spring 38, its inner end being secured to the fixed shaft 37. Said spring is so wound that it tends constantly to turn the recording wheel 36 rearwardly at the top, and therefore also to move the corresponding slide piece 31 rearwardly. It is normally prevented from doing so by the engagement of the pin 21 with the end of the arcuate slot 20. But, when the operator operates the handle 12, in the manner previously described, said slide piece 31 then moves rearwardly, because the arcuate slot itself moves rearwardly, which permits the pin 21 in said slot, and also the cross bar 26 supported by the rock shaft, to move rearwardly. This they do on account of the force of the spring 38. The extent of this rearward movement, and therefore also the angular position to which the recording wheel is moved with said rearward movement of the slide, is dependent upon the particular key operated, the slidepiece being variably arrested by a stop 34' thereon striking the lower end 10 of the key stem.

Around the shaft 14 is a coiled spring 39, which is sufficiently powerful, not only to return the operating handle to its normal position when released, and thereby through the slotted segment 19 and the pin 21, to return the slide pieces 31 to their normal position, but also to overcome the tension of all the coiled springs 38 of the recording wheels.

Each recording wheel 36 carries upon its peripheral face a series of marking devices or dies 40 for marking characters, namely, the dollar sign, zero, and the numerals from "1" to "9". All of the dies of the rollers are inked by inking rollers 41 as the rollers rotate. The casing 2 is formed with a horizontal slit 42 forming a guide for the insertion of a check, the leaf of a pass book, or other paper which is to be marked. Extending transversely under the lowest portion of all of the recording wheels is a bar 43, having under each wheel a raised portion 44 with a roughened upper surface, said bar being supported upon a lever 45, pivoted at its front end upon a suitable standard 46, said lever being normally pulled upward by a coiled spring 47. The free end of said lever carries a roller 48 which is adapted to be engaged by a pawl 49 pivoted at 50 upon the slotted segment 19, its rearward movement being prevented by a shoulder 51 formed on said segment, although it is permitted a forward movement, away from said shoulder. A spring 52 normally presses the pawl against said shoulder. When the operator operates the handle, the first part of the movement of the slotted segment is of sufficient amplitude to permit the slide piece 31 to move to its full distance, corresponding to the depression of the key "9", if necessary. In the further movement of the slotted segment, the pawl 49 actuates the roller 48 and depresses the lever 45 and, when said pawl passes said roller, the spring 47 retracts the lever and thereby moves the roughened blocks 44 against the under side of the check or other paper, and forces the latter against the die 40 on the recording wheel to thereby mark the check. The serrations of the roughened block 44 produce corresponding markings in the paper which are rendered more prominent by means of the inking of the dies.

Each slide piece is formed with an upward extension 55, bent forwardly at the top to form a type carrier 56, on which are a series of type 57, each having a stem 58, slidable vertically in said carrier and normally depressed by a coiled spring 59. The type of each series are adapted to print the numerals "0" to "9", and they are arranged at intervals equal to the successive increments of the distance traveled by the slide piece on the depression of the keys 6. Said type 57 face upward, and above them is extended an inking ribbon 60, above which is a platen 61, between which platen and the inking ribbon 60 is adapted to be interposed paper 62 fed from a roll 63 and passing between said platen and a guide roller 64. When, by the operation of the keys of the several columns, the corresponding type have been moved beneath the center of said platen, the lower ends of all of the stems of the type thus brought into printing position are adapted to be struck by a transversely extending hammer 65 carried on the free end of a lever 66 pivoted on a transverse shaft 67 and having a rear arm 68 normally drawn down by a spring 69, the spring being of sufficient tension to prevent the hammer dropping too far, while at the same time being insufficient to raise the hammer into the path of the lower ends of the type stems when they are moved by the movements of the slide pieces 31. In a recess in a collar mounted on the shaft 14, is pivoted a pawl 70, which is arrested in its rearward movement by a shoulder 71 on said collar. When the operator actuates the operating handle 12, said pawl 70, being prevented from moving forwardly by said shoulder 71, engages the end of the arm 68 of the lever 66 and moves the same forwardly against the action of said spring 69, and thereby lowers the hammer 65 until said pawl 70 passes said arm 68. When said arm is released from said pawl, it descends under the action of the spring 69 and moves the hammer rapidly against the lower ends of the stems of the type, thereby making an impression upon the paper. The platen is turned by hand to move the paper to the proper position for the next impression, the distance through which the paper moves being regulated by a pawl 72 and ratchet wheel 73 in the usual manner. On the return movement of the handle, the pawl 70 will engage the arm 68 and be turned thereby on its pivot into a groove 53, but will fall by gravity and pass the arm 68 when the handle is at rest.

Pivoted at 75 upon an extension 76 of the rear of the guide plate 11 are plates 77, each having a slot 78, through which pass all of the stems 5 of the keys 6 of the corresponding column, each stem having a pin 79 extending transversely over said plate 77. Each plate at its front end extends over the tops of three vertical additional or terminal keys in the form of rods 80, 80', 80'', slidable vertically in the guide plate 11, and arranged longitudinally of the machine, and in front of the key stems, but to one side thereof, each rod being pressed upward by a coiled spring 81. Extending laterally from each rod, below said guide plate 11 is a pin 82.

The first rod 80 for each of the columns is for the purpose of preventing any movement of the recording wheels into a printing position unless one of the keys 6 has been operated, so that, if the operating handle is actuated without first depressing one of said keys 6, the serrated blocks 44 will be moved into blank spaces 83 in the register wheels, and no wear or damage can be thereby caused to the marking devices 40 of said wheels. The top of each of said front rods 80, except the one on the extreme right, is formed with an extension 84 to the right, which extends over an extension 85 to the left formed upon the top of each of said front rods 80 except the one to the left. The effect is that, when any key of any column is depressed, the pivot plate 77 of that column is depressed, and thereby the front rod 80 of said column is also depressed, and all the front rods of the columns to the right are likewise depressed, but not of those to the left. Each plate 77, however, extends over the extension 86 of the front rod to the left, so that, upon the depression of any key of any column, the front rod 80 next on the left is also depressed, but none of the other front rods 80 on the left, the object being to permit the slide piece 31 on the left of the column, a key of which has been operated, to slide past said controller rod 80 into the position in which the dollar mark on the recording wheel corresponding to said slide piece on the left can be printed.

For a similar purpose there is provided on the extreme left of the series of six slide pieces 31 a slide bar 87, especially for marking the dollar mark, controlled by a stop rod 88 in line with the front rods 80 of the columns of keys. Behind said front movable stop rod 88 is a stationary stop rod 89 which always arrests the slide bar 87 on the extreme left in the position in which the corresponding recorder wheel records the dollar mark.

The second row of stop rods 80' is for the purpose of arresting the slide pieces 31 in the positions in which the corresponding register wheels register the dollar mark. Each of the second stop rods 80' is, like the first stop rod, formed at the top with an extension 84' to the right and an extension 85' to the left, the extension 84' to the right of each stop rod 80' extending over the extension 85' to the left of each stop rod 80' on the right, so that, upon the depression of any key of any column, and the resultant depression of said pivoted plate 77 of said column, all the second stop rods 80' on the right are depressed, so that the register wheels on the right can move past the dollar mark. Each pivoted plate 77 is, however, as shown at 90, cut away on the left, opposite to the extension 84' of the second stop rod 80' on the left of said plate, so that, when the pivoted plate 77 is depressed, it clears the extension on the right 84' of the second rod 80' immediately to the left, so that the register wheel immediately on the left can move to the position to make the dollar sign.

All the register wheels on the right of the column a key of which is being actuated are free to move so as to be arrested by the third row of stop rods 80'', which are for the purpose of stopping the register wheels in the positions in which they will mark a zero sign. Consequently, if, for instance, in the third column, the numeral key "5" be depressed, and no other key be depressed, the dollar sign will be marked by the register wheel corresponding to the second column, the numeral "5" will be marked by that corresponding to the third column, and the zero sign will be marked by all the columns to the right.

In order to prevent any key being actuated until after the completion of the operation effected by the depression of any other key in the same column, there is provided, for each key of that column, on a shaft 91 for each column extending from front to rear of the machine, a locking segment 92 (Fig. 6) having a circular portion 93, a recess 94 and a projecting arm 95. Said arm is adapted to be engaged by a pin 96, secured upon said key stem, so that, when the stem is depressed, the shaft 91 is rocked, thereby moving the circular portions 93 of all of the other segments 92 beneath the said pins 96 upon the keys of the same column, and preventing the depression of said keys until the locking shaft 91 is returned to its original position. It is also necessary to hold the operating keys which are first operated down, in their operative position, until all the necessary keys have been depressed before the printing operation takes place. To do this, there is secured upon the end of each shaft 91 a vertical sleeve 100 in which can slide a stem 101 having at the top a head 102 which limits its downward movement, and at the bottom a dog 103. Said stem is normally depressed by a spring 104 between said dog and sleeve. Upon the operating shaft is fixedly secured a sleeve 105, the main portion of which is eccentric or cam-shaped in cross section, that is, having a normally uppermost part 106 of less thickness than the remainder. Said sleeve is formed, at intervals corresponding with the distance between the columns, with circular rings or flanges 107 each formed at the top, or that part which is radially in line with the thinnest portion of the sleeve, with a notch or opening 108, through which can pass the dog 103. Immediately on the right hand side of each flange looking from the front, or on the left looking from the rear, as shown in Figs. 5 and 6, said sleeve is also formed with a rib-like extension or thickening 110, located immediately above the thinner portion 106 of the sleeve, said extension forming a true circle with the main portion of the sleeve. Before a key is depressed, the parts are in the position shown in Fig. 5 and also on the left of Fig. 6, in which the dog 103 is on the left of the ring 107 looking from the front. When the key is depressed the pin 96 of its stem, engaging the arm 95, rocks the shaft 91 and causes the dog 103 to pass through the notch or opening 108 in the ring 107. Said dog is formed with a beveled advancing lower side 111, and when this side impinges upon the bottom of the notch 108, and also upon the top of the rib 110 said dog is pressed upward, as the shaft 91 is turned, until the dog passes over said rib 110, and thereupon the spring projects the dog into the position shown on the right of Fig. 6 and in Fig. 7. In this position it is locked until the operating shaft is turned. When the operator has depressed the numeral keys of the several columns for the purpose of printing a row of figures, all the keys so depressed are by the above mechanism locked until the operator actuates the operating handle. In moving the handle through even a very small distance, in the operation of the same, he immediately locks all the other keys, which have not been actuated, so that they cannot be actuated, for, by moving the handle and rocking the shaft he moves all the notches or opening 108 in the rings 107 into a position so that the dogs cannot pass through them. When the operating handle has been moved far enough to print from the recording wheels corresponding to the columns in which keys have been actuated, the keys 6 are then released, for the eccentric or thinner portion of the sleeve rotates under all the dogs which have been moved thereonto and raises them past the end of the corresponding raised portions or ribs, and immediately said dogs move longitudinally on said sleeve, being caused to do so by the upward pressure of the springs 7 around the stems of the keys acting through the pins 96 against the upper sides of the recesses 94. Said dogs then abut against the right hand sides of the rings 107 on the sleeve, (left hand side Figs. 5 and 6), and remain in this position until the operating handle has been released and the operating shaft has been rocked back to its original position. While the said shaft is so rocking back, the lower ends of said dogs ride upon the raised portions or ribs 110 until said dogs arrive at the notches or openings 108 in the rings, whereupon on account of the upward pressure of the springs 7, they immediately pass through said notches to their original position, shown in Fig. 2.

For the purpose of accumulating, or totalizing, the amounts so printed, there is formed on each slide piece 31 a downwardly facing rack 112, which is adapted to engage a gear wheel 113 which is loosely mounted in a groove 114 formed in a sleeve 115 which rotates on another sleeve 116, which can rotate loosely on a shaft 117 extending transversely of the machine. When any numeral key is depressed, and the operating handle has been operated to print the corresponding numeral, from the movement of the slide piece which moves the register wheel to any required number, a corresponding movement takes place in the gear wheel 113 owing to its engagement with said rack 112. If now a numeral key in the same column be again depressed the slide piece 31 will move a second time, and the gear wheel will be again advanced, so that the total advance which it has made will correspond to the sum of the two numerals corresponding to the numeral keys depressed. The same will be true however many times the numeral keys in said column are operated and the operating handle is actuated to obtain a record thereof.

Omitting for the present, the description of the mechanism for carrying or transferring from one such wheel to another, it will first be explained how this total is obtained in the machine. This is done by providing a lower rack 118 facing upward, and similar to, and co-extensive with, the upper rack 112. As will be presently described, provision is made for shifting the shaft 117 by means of a small handle 119, to a lower position. A gear wheel 120 is formed on the sleeve 115, and is rotated with the gear wheel 113, by means of a pawl 121 carried on a radial extension 122 of said gear wheel 113. In the lower position, said gear wheel 120 can engage said lower rack 118 for obtaining totals. When the operator desires to obtain a total of the numbers registered by the machine, he so actuates said handle 119. The gear wheel 120 is now in the lower position adapted to engage the lower rack 118. Upon operating the handle 12, the slide piece 31 moves rearward, and the rack 118 engages the gear wheel 120 and rotates the same. The extent of rotation, and therefore also the extent of the rearward movement of the slide piece 31 depends upon the numerical distance, counting from zero, through which the gear wheel 120 has been rotated, or stands, at the time the operating handle is actuated. For instance, supposing that the operator depresses, in a column, first, the numeral key "1", then the numeral key "3", and then the numeral key "5", the gear wheel will have rotated through the same angular distance as when the register wheel has rotated to print the numeral "9". It will then be in the position shown in Fig. 13. When the rack advances, by reason of the movement of the operating handle, it turns the totalizing wheel in the reverse direction to that in which it was turned when totalizing; in other words, it causes the totalizing wheel to subtract, and this reverse movement continues until a pin 125 extending laterally from the side of the totalizing wheel (Fig. 13) engages a pin 126 extending radially from a sleeve 127, hereinafter more fully described, and, which at this time, and normally, is held in a fixed vertical position. Thereby the rotary movement of the gear wheel 120 is arrested, and consequently the rearward movement of the rack 118, and therefore the slide piece is also arrested. The arrangement is such that the arrest occurs in a position when the type for printing the numeral "9" is in position for printing upon the recording sheet. The gear wheel 120 will then be in the position shown in Fig. 13. In the continued movement of the operating handle said printing is effected, and the slide bar is released and returns. Upon returning the slide bar, the totalizer again returns to its original position, registering the total, of 9.

A second series of totalizing wheels 113' and 120' is also provided, operated in precisely the same manner as the first series, namely, by an upper rack 112' for addition or totalizing, and a lower rack 118' for obtaining a record of the total. By a suitable arrangement also, not here shown, one of these series may be made generally accessible and used for temporary work while the other may be preserved from general accessibility, and retain a permanent record of the total.

Since the totalizers themselves form no part of the invention no further showing of their operating parts is made than is actually necessary to make them operative, but it is necessary to provide that the means for carrying out the operations common to totalizers be concealed and inaccessible to the ordinary operator in the case of the set of totalizers, correlated with the book printing type bars while he has the usual control over the set of totalizers not used in connection with the check or pass book printing type.

In Figs. 8, 9, and 10, are illustrated the means which are employed for selectively bringing into operative position the one or the other of these series. 130 indicates stationary frames secured within the frame of the machine, and identical in construction. Each frame is formed with two circular guideways 131, 131', for circular plates 132, 132', rotatable in said guideways. Through the plates 132 nearer the front of the machine passes the shaft 117 upon which are mounted the series of totalizing wheels 113, while through the plates 132' toward the rear of the machine passes the shaft 117', upon which are mounted the rear series of totalizing wheels 120'. Said shafts project at one end through the respective plates to form handles 119, 119', and are connected by a link 135. This arrangement is illustrated diagrammatically in Fig. 10, which indicates the position of the parts when the front series of totalizing wheels are in their upper position and therefore arranged for totalizing. It will be seen that, on account of the relation which the length of the link bears to the distance between the two circular bearings, when the front totalizing wheels are in the upper position the rear totalizing wheels can take only an intermediate position, adapted to engage neither the upper nor lower rack. If now the front totalizing wheels are lowered into the position for recording, this does not affect the position at that time of the rear totalizing wheels, which are still in the intermediate or inoperative position. Suppose now that it is desired to operate the rear series of totalizing wheels, as for making an independent calculation or totalization of a series of numbers, the rear totalizing wheels are moved to the upper position. The link then assumes the position shown in the upper dotted lines in said diagram, so that said front totalizing wheels are in an intermediate or inoperative position. They remain in this position during the time that the series of numbers are being accumulated on the totalizing wheels, and they also remain there when the rear totalizing wheels are lowered for the purpose of taking a record. It will be seen that by this contrivance only one series of totalizing wheels are in an operative position at any one time, and that the position of either series is not affected by the movement of the other series from the totalizing to the recording position.

With the above arrangement it is necessary to guard against the possibility of being able to move the series of totalizing wheels so that they would not be engaged by either the upper or the lower rack, then to operate the handle so as to move the slide piece and the racks formed thereon, and then to again return the teeth of the totalizing wheels into engagement with one of said racks, the effect of which would be to produce an erroneous computation. To prevent this, there is provided a slide 140 having a vertically slotted rear end 141 engaged by the transverse shaft 117' which slide is formed with three longitudinal or horizontal slots 142 all connected with each other at their rear ends. The shaft 117' of the rear series of wheels is in line with these slots respectively in its uppermost, intermediate, and lowermost positions, and the slots are made of the exact width of said shaft, so that, if the shaft be not exactly in one of said positions, a part of the slide 140 between the slots will, upon the longitudinal movement of the slide piece 31, strike said shaft 117' and either prevent said movement and therefore also the operation of the handle, or will force said shaft 117' into one of said three positions. Since the several positions of the front shaft 117 correspond accurately with the positions of the rear shaft 117' it follows that neither the front nor the rear series of totalizing wheels can be moved into such a position that neither of them will engage one of the racks upon the slide piece, and the operating handle operated.

It is necessary to remove from the path of the slide pieces 31 the three front rows of controller rods 80, 80', 80" when it is desired to print the totals on either totalizing mechanism. For this purpose, to the disk 132 for the front totalizing mechanism there is pivotally attached a link 123 having an upper slotted end 124 guided by a pin 134 and adapted to engage a rearward extension 128 of the plate 77. When the said totalizing mechanism 113 is lowered, to record the total, said link being attached on the opposite side of the disk to the handle, is simultaneously raised, and thereby the rear extension of the plate 77 is raised and the front end depressed, thereby depressing all of the front controller rods 80, 80', 80" and permitting the slide pieces 31 to pass the same in the recording movement. A similar provision is made for the rear or temporary totalizing mechanism.

Attached to the disk of the front totalizing mechanism is a cam plate 129, the lower end of which is adapted to engage the pin 133 upon which is mounted the roller 48. When either series of totalizing wheels is lowered for the purpose of recording the total, said cam being moved around with the disk, engages said pin, and moves the roller 48 out of the path of the pawl 49 so that the operating handle 12 can be operated without said pawl engaging said roller. The cam is formed in its edge with two recesses or depressions, the first one 136 being arranged to engage said pin 133 when the disk is in the intermediate position, and the second recess 137 when the disk is in the lowermost position. Said pin engaging said recess serves to center or hold the parts in place.

Upon the transverse shaft 138 is pivoted a lever 139 carrying at its front end a shutter 109 its rear end being adapted to be engaged by a cam 99. When the front totalizing wheels are moved, either to the intermediate or to the lowermost position, the rear end of said lever 139 is depressed, so that the shutter carried by the front end closes the front end of the slot 42 to prevent the insertion therein of a check, or other paper.

It will also be observed that the cam 129 positively prevents printing from the check perforating wheels whenever the totalizer correlated therewith is not having items accumulated thereon, so that no checks or books can be fraudulently printed without at the same time accumulating the amounts printed thereon.

The details of construction of the totalizing wheels are illustrated in Figs. 19 to 23.

Fixedly secured upon a computing shaft 117 are a series of collars 144 in each of which is pivotally mounted a latch 145. Intermediate between said collars and fixed upon the shaft 117 is a second series of collars 146. Rotatable about the collars 146 and also about the shaft are a series of sleeves 116 each having an arm 147 from which extends laterally on the right a pin 148. Rotating on said sleeves 116 is a sleeve or wheel 115, formed on the left hand side with ratchet teeth 149, and on the right hand side with gear teeth 120. Rotating in a groove in said wheel 115 is a driving gear wheel 113. As already explained, this driving gear wheel is adapted to mesh with the upper rack 112 and to be rotated thereby, while the gear wheel 120 formed on the right of the wheel 115 is adapted to be rotated by the lower rack 118 in the opposite direction to the gear wheel 113. Formed upon the gear wheel 113 is the arm 122 which carries a spring-actuated pawl 121 adapted to engage the ratchet teeth 149 of the wheel 115. Consequently, although the upper rack 112 rotates the gear wheel 113, first in one direction, and then in the opposite direction in the return movement of the rack, since the gear wheel 113 imparts movement to the wheel 120 only by means of a spring actuated pawl, said movement is imparted only in the advancing direction of the rack, and not in the return movement thereof. Corresponding, therefore, to each distance through which the rack 112 is reciprocated upon the actuation of the operating handle, the wheel 120 is rotated in a forward direction a corresponding angular distance, and these angular rotary movements are accumulated in the successive reciprocations of the rack.

It has been already explained how the angular distances through which the wheels 120 have thus been rotated from the zero position are recorded by means of the lower rack 118, and, after being so recorded, said wheels are left in the same angular position as before, thus permitting the accumulation to continue after making such a record.

It now remains to be explained how the transfer is made from one wheel of the series to the next on the left, when to the number registered by the first wheel is added a number which makes the total more than 9. Upon the shaft 117, adjacent to the collar 144 is rotatably mounted an arm 150, normally rotated in the same direction as the forward rotation of the wheels by a coiled spring 151 secured to said arm and to one of the collars 146. Through the end of said arm passes loosely a shaft 152 carrying, at one side of said arm, a sleeve 127 from which extend inwardly, or toward the fixed shaft 117, teeth or lugs 126, 155. On said shaft 117, on the other side of said arm, is secured a sleeve 156, from which extends, at about a right angle to the tooth 126, a tooth 157. Extending to the left from each of the wheels 116 is a pin 125 which, when the wheel 115 has been rotated through an angular distance corresponding to the registration of the numeral "9," is brought into such a position that it engages the leading or advancing tooth 126. In like manner from the right hand side of said wheel 116 extends laterally a pin 148 in alinement with the pin 125 on the left. These pins, and the arms carrying the same, move in slots 161, 162, formed in the wheel 115 when the wheel 115 has moved to such a position as to register the numeral "9," the rear ends of said slots have brought said pins to the position shown in Fig. 13. In this position the pin 125 on the left is adapted to engage the tooth 126, extending downward from the sleeve 127. On the subsequent advance of the wheel 115, and therefore also of the sleeve 116, with the pins carried thereby, said pin 125 engages said lug or tooth 126 and advances the same into the position shown in Fig. 14. The lug or tooth 157 carried by the other sleeve 156 upon the shaft 152 is thus moved to the upper position as shown in said figure, and is in the path of a pin 159 extending laterally from the upper rack. Therefore in the return movement of the upper rack, said pin 159 moves the arm 150 rearwardly upon the shaft 117, as shown in Fig. 16. The first effect of the rearward movement of the rack is to raise a pawl 164 pivotally carried upon the shaft 152 and normally depressed by a spring 165, but adapted to be raised by means of a tooth 166, on the sleeve 156 engaging a pin 167 extending laterally from the pawl. The end of the pawl is thereby raised from off the teeth 120. This upward movement is arrested by the tooth 126 abutting against a pin 154 upon the arm 150. The rearward movement of the rack can now therefore have only the effect of moving rearwardly the arm 150, and this it does, carrying with it the pawl 164, until the arm has been rotated through such an angle that the pin 159 arrives at the position shown in Fig. 16 and leaves the upper tooth 157. By the force of the spring 165, the pawl immediately drops into engagement with the teeth 120, and immediately afterward the coiled spring 151 returns the arm 150 to its normal position, thereby causing the wheel 120 to advance one-tenth of a revolution.

The inner edge of the free end of the pawl 164 is formed to enter between two adjacent teeth of the wheel 120, thereby serving to center said wheel accurately, whenever its angular position has been changed.

Since the transfer to, and accumulation by "1" on, the next wheel to the left is made on the return movement of the rack, a difficulty would arise that, should the next wheel on the left stand at "9" when the transfer is made, while the above mechanism would suffice to move said wheel on the left from the position "9" to the position "0," it would not carry on to the second wheel on the left, since this carrying on, or transfer, is only completed by the return movement of the rack, which return movement has been already utilized for effecting the movement of the first wheel to the left. It is in order to provide against such a contingency there is formed upon the sleeve 156 the tooth 155 extending inwardly, but at an angle with the direction of the arm 126, and in such a position that, when the pin 125 extending from the right to the next wheel 120 on the left has been brought to the "9" position, said tooth 155 is immediately behind said arm. With this arrangement, if, say, three wheels in succession on the left of the wheel which is being operated all stand at the position "9," the three teeth 155 of said wheels are immediately behind the pins 148, and the result is that, when the first wheel is operated, and is advanced from the "9" to the zero position, all the other wheels are likewise advanced through the greater part of the distance between the "9" and "0" positions. They are then centered in the proper position by the pawls 164, the free ends of which enter between the gear teeth of the wheels 120 and thus complete the advance.

In order to hold the arm 126 against rearward movement there is pivoted in the collar a spring latch 145, which, after the teeth 126, has passed it, springs up into position behind the tooth and prevents its return movement.

Some of the parts which have been above described for the intermediate wheels are not necessary for the terminal wheels. Thus, for the first wheel on the right the swinging arm 150 to the right of said wheel is not necessary. Its place is taken by a fixed arm 169 which carries a pawl 170, the function of which is merely to engage the teeth of the wheel and thereby center the same. In both terminal wheels the inner sleeve 116 carrying the two pins is not necessary, but the first wheel 120 on the left only has a pin, and this pin is secured directly to the wheel 120 thereof. In like manner the wheel on the extreme left is not required to have an arm projecting from the sleeve.

From the above description the operation of the machine will be seen to be as follows: If a check or pass book is to have an amount printed thereon, the sheet of paper to be printed upon is inserted in the slit 42 of the casing of the machine, whereupon the proper keys for entering the amount in the book will be depressed by the operator. The depression of each key is followed by the locking of said key in the depressed position, (note the right hand portion of Fig. 6) and at the same time the cams 93 adjacent each of the other keys of that column lock said keys in the raised position. The depression of any key in a column depresses the bar 77 at the same time which causes the depression of all of the terminal stops of that column, so that they will not interfere with the operation of the slide 31 upon the operation of the machine. At the same time, assuming the amount $400 to be written, the terminal stop at the left of the column in which the 4 is depressed will be depressed so that the dollar sign will be printed upon the type wheels 36, while at the same time all of the terminal stops at the right of the 4 will be so depressed that each of those type wheels at the right of the 4 will print the zero. Note for the operation of the bars 77 Figs. 1, 2 and 3. Upon the setting of the keys, the handle 12 may be pulled forward. The first operation of the handle is to set the slides 31 in such a position as is determined by the terminal stops and the key stops, the accumulation of the increment of movement of each slide being effected upon the totalizer set 113. As the handle 12 is moved forwardly and downwardly, the pawl 70 passes the projection 68 of the hammer 66. Also during the travel of the handle 12, the pawl 49 pushes against the roller 48 until it passes the same. When both of these pawls slip off the parts with which they contact the platen 43 and hammer 66 will cause impressions to be made at the two printing places, whereupon the handle 12 may be permitted to return to its initial position, and as it returns to its initial position the latch 111 moves up the cam 110 and finally passes through the slot 108 to permit the return of the depressed key to its initial position. In this manner the teller may keep an exact record of every amount for which he is responsible upon the strip 62, and at the end of any period he may ascertain the total thereof by shifting the totalizers 113 downwardly into contact with the rack 118.

When the total is to be taken from the totalizers 113, the shifting of said totalizers into connection with said rack 118 causes the cam 129 to shift the shutter 109 up across the opening 42, thereby preventing the insertion of a check therein. The lever 45 at the same time shifts the printing mechanism adjacent the wheels 36 downwardly so that the pawl 49 cannot cause an impression to be made by said wheels. After the totalizers 113 have been set to take the total, all that is necessary is to operate the handle 12 forwardly, whereupon the total will be struck upon the strip 62, said totalizers being rotated by the rack 118 the proper amount to show their respective totals, as was previously explained.

When it is desired to operate the machine simply as an adding machine, all that is necessary is to shift the totalizers 113 and 113' so that the latter set of totalizers is in a position to contact with the rack 112', whereupon the machine may be used as an ordinary adding machine without, in any way, interfering with the total accumulated upon the totalizers 113. When so set for operation as an ordinary adding machine, the cam 99 will close the slit 42 and will prevent the platen 43 from printing from the set of wheels adjacent the same, in the same manner as when the totalizers are set down against the rack 118 for the purpose of printing a total therefrom.

Further explanation is not given of the operation of the totalizers themselves for the reason that they may be of several different forms, but it is necessary to point out that some locking device is necessary to prevent them from spinning should the machine be operated too rapidly, and this device comprises the pawl 164, which places such resistance upon the movement of the gear wheel 120, as may be necessary to prevent undue movement thereof, no matter how fast the machine may be operated.

It is to be here noted that the only time the slit 42 is open so that the operator can print from the type wheels 36 is when the totalizers 113 are so set as to accumulate thereon amounts printed by said printing wheels. That is to say, that if a total is to be taken from said wheels no printing can be done thereby, nor can any printing be done from said wheels unless the totalizers 113' are out of use, since in both the intermediate and lower positions of said totalizers is the shutter 109 moved to prevent the insertion of a sheet through the slit 42.

I claim:—

1. The combination of a series of columns of keys, two recording devices for each column, two series of accumulators, one of each series forming a pair corresponding to each column of keys, means whereby, when either series of accumulators is operative, the other series is automatically rendered inoperative, means whereby when one of said series of accumulators is rendered inoperative, one of said series of recording devices is also automatically rendered inoperative, and means for simultaneously moving said recording devices and also the operative series of accumulators through variable distances in correspondence with the particular keys depressed in the corresponding columns, substantially as described.

2. The combination of a casing, a series of columns of numeral keys, two recording devices for each column, said casing being provided with means for removably guiding paper into proximity to one of said series of recording devices to print therefrom, and also with means for supporting a roll of paper in proximity to the second series of recording devices to print therefrom, two series of accumulators, one of each series forming a pair corresponding to a column of numeral keys, means whereby, when either series of accumulators is rendered operative, the other is automatically rendered inoperative, means whereby when one of said series of accumulators is rendered operative the first-named series of recording devices is rendered inoperative, and means for simultaneously advancing the operative recording devices and accumulators through variable distances in correspondence with the particular keys depressed in the corresponding columns, substantially as described.

3. The combination of a series of columns of keys, a corresponding series of recording devices, slidepieces, operatively connected with the several recording devices, springs for moving said recording devices and slidepieces, a transverse bar normally arresting all of said slide pieces, a shaft, an operating handle thereon, a slotted segment carried by said shaft, a link connected to said bar, having a pin in said segment, and a spring tending to rotate said operating shaft in opposition to the aforesaid springs, substantially as described.

4. The combination of a series of columns of keys, a corresponding series of recording devices, slidepieces operatively connected with the several recording devices, springs for moving said recording devices and slidepieces, a transverse bar normally arresting all of said slide pieces, a shaft, an operating handle thereon, a slotted segment carried by said shaft, a link connected to said bar, having a pin in said segment, a spring tending to rotate said operating shaft in opposition to the aforesaid springs, a printing lever, a block on said lever adapted to press a sheet of paper against said wheels, a spring for pressing said block toward said wheels, and a device carried by said segment adapted to engage the printing lever to move it against the action of said spring, substantially as described.

5. The combination of a series of columns of keys, a corresponding series of recording devices, slidepieces operatively connected with the several recording devices, springs for moving said recording devices and slidepieces, a transverse bar normally arresting all of said slide pieces, a shaft, an operating handle thereon, a slotted segment carried by said shaft, a link connected to said bar, having a pin in said segment, a spring tending to rotate said operating shaft in opposition to the aforesaid springs, a printing lever for the recording devices and means carried by said segment for controlling said print lever, substantially as described.

6. The combination of a casing, a series of columns of numeral keys, a corresponding series of type carrying means within the casing, a plurality of sets of type carried by each of said means, means variably limited by the depression of the several keys of the columns for simultaneously moving a plurality of type carrying means of both series into position to print, the casing being so formed as to permit of the insertion of a sheet of paper into proximity with a line of type of one set, and so as to permit of a roll of paper being advanced to present a part thereof in proximity with the printing line of the other set, operating mechanism, and means, actuated in a continuous movement of the operating mechanism, for printing from both of said lines of type, substantially as described.

7. The combination of a casing a series of columns of numeral keys, a corresponding series of type carrying means within the casing, a plurality of sets of type carried by each of said means, means variably limited by the depression of the several keys of the columns for simultaneously moving a plurality of type-carrying means of both series into position to print, the casing being so formed as to permit of the insertion of a sheet of paper into proximity with a line of type of one set, and so as to permit of a roll of paper being advanced to present a part thereof in proximity with the printing line of the other set, a series of totalizing wheels variably advanced with the movements of the corresponding type carriers of the two sets, operating mechanism, and means, actuated in a continuous movement of the operating mechanism, for printing from both of said lines of type, substantially as described.

8. The combination of a series of columns of stops, a longitudinally movable type carrier for each column of stops, means for so moving said type carrier, means, dependent upon the particular stop depressed in said column, for variably arresting said type carrier, a terminal stop of said series being provided with vertically movable means for normally arresting said type carrier, and a longitudinal plate adapted to be depressed by the depression of any mediate stop of the series, and to depress also said arresting means of the terminal stop, substantially as described.

9. The combination of a series of columns of stops, a longitudinally movable type carrier for each column of stops, means for so moving said type carrier, means, dependent upon the particular stop depressed in said column, for variably arresting said type carrier, a terminal stop of said series being provided with vertically movable means for normally arresting said type carrier, and a longitudinal plate adapted to be depressed by the depression of any mediate stop of the series, and to depress also said arresting means of the terminal stop, of an adjacent column, substantially as described.

10. The combination of a series of columns of stops, a vertically movable plate for each column adapted to be moved by the depression of any one of the stops in said column, a register mechanism for each column, means for controlling said register mechanism dependently upon the particular stop of said column so depressed, an additional stop for each column, means whereby said additional stop normally controls said register mechanism, for that column, and means whereby said plate, when actuated by any one of the stops of the column, also actuated the additional stop, substantially as described.

11. The combination of a series of stops, a register mechanism, a device connected with each stop for variably controlling said registering mechanism, additional stops, normally controlling said register mechanism, and a longitudinal vertically movable plate adapted to be depressed by the depression of any stop to move said additional stops out of the position so controlling said register mechanism, substantially as described.

12. The combination of a series of stops, register mechanism, a device connected with each stop for variably controlling said registering mechanism, additional stops, normally controlling said register mechanism, and a longitudinal vertically movable plate adapted to be depressed by the depression of any stop to move said additional stops out of the position so controlling said register mechanism, substantially as described.

13. The combination of a series of stops, a register mechanism, a device connected with each stop for variably controlling said registering mechanism, additional stops, normally controlling said register mechanism, and a longitudinal vertically movable plate adapted to be depressed by the depression of any stop to move said additional stops on both sides of that of the stop so depressed, out of the position so controlling said register mechanism, substantially as described.

14. The combination of two series of computing wheels, each formed with gear teeth, upper and lower racks for engaging the teeth of the wheels of the two series, means for controlling the positions of said wheels relative to said racks, comprising movable bearings for the shafts of said wheels, and a connection between the bearings of the two series permitting either bearing to be moved to shift the shaft from its uppermost to its lowermost position without changing the position of the other bearings, substantially as described.

15. The combination of two series of computing wheels, each formed with gear teeth, upper and lower racks for engaging the teeth of the wheels of the two series, means for controlling the positions of said wheels relative to said racks, comprising circular bearings for the shafts of both series, supports in which said circular bearings can rotate, and a link connecting said bearings, whereby the angular position of each bearing determines that of the other, substantially as described.

16. The combination of two series of computing wheels, each formed with gear teeth, upper and lower racks for engaging the teeth of the wheels of the two series, means for controlling the positions of said wheels relative to said racks, comprising circular bearings for the shafts of both series, supports in which said circular bearings can rotate, a link connecting said bearings, whereby the angular position of each bearing determines that of the other, and means for positively locking said bearings during the computing movement of said wheels, substantially as described.

17. The combination of two series of computing wheels, each formed with gear teeth, upper and lower racks for engaging the teeth of the wheels of the two series, means for controlling the positions of said wheels relative to said racks, comprising circular bearings for the shafts of both series, supports in which said circular bearings can rotate, a link connecting said bearings, whereby the angular position of each bearing determines that of the other, and means for positively locking said bearings during the computing movement of said wheels, comprising a part movable with said racks, and having slots parallel with the direction of movement and adapted to engage a part of one of said bearings in its uppermost, lowermost, or middle position, respectively, substantially as described.

18. In an apparatus of the character described, the combination of a shaft, upper and lower racks, a gear wheel adapted to engage with the lower rack, a gear wheel rotatable about the first gear wheel and adapted to rotate with the upper rack, and an operative connection between said gear wheels, whereby one of them is advanced by the advance of the other, but permitting the latter to recede without retracting the other, substantially as described.

19. The combination of a shaft, a series of computing wheels thereon formed with ratchet teeth, a second series of computing wheels, each rotatable about one of the first series, and provided with a pawl for engaging the ratchet teeth of said wheel, and being also formed with gear teeth, and a longitudinally movable rack for engaging said gear teeth, having a recess into which said pawl can pass in the rotation of the wheel carrying the same, substantially as described.

20. The combination of a series of columns of stops, a registering mechanism for each column, a device moved by each stop for variably controlling said registering mechanism, two terminal stops for each column, one of said terminal stops being arranged to arrest said registering mechanism at the position to register the dollar sign, and means whereby the depression of any main stop of a column automatically operates all the second terminal stops of the columns on the right, and also operates the first supplementary stop of the column immediately on the left, substantially as described.

21. In a computing machine, the combination of a series of columns of numeral keys, a registering mechanism for each column, means set by each key for variably positioning said registering mechanism, a terminal stop for each column to arrest the registering mechanism at the position to register an additional character and means whereby the depression of any key of a column operates the terminal stop of the column immediately at the left of the key operated, as set forth.

22. In a calculating machine, the combination of a series of keys, two sets of totalizers, printing devices, means to accumulate the items printed by said devices upon one of said sets of totalizers, means to prevent an impression from being taken from one of said printing devices when the set of totalizers correlated with that printing mechanism is not in use and means whereby the other set of totalizers may be correlated with the operating mechanism so that the machine may be used to effect the normal operations of the calculating machine.

23. In a calculating machine, the combination of columns of keys, two sets of totalizers, printing devices correlated with one of said sets of totalizers to accumulate on the totalizers the items printed, means whereby the other set of totalizers may be correlated with the operating mechanism, means to prevent an impression from being taken from one of said printing devices and means to prevent the insertion of a sheet in the machine at that time.

24. In a calculating machine, the combination of sets of keys, two sets of totalizers, means to correlate either set of totalizers with the keys, a plurality of sets of type, a separate platen for each set of type, means for variably positioning said type, mechanical means for producing substantially uniform impressions from each set of type when positioned, and means whereby the items printed by each set of type may be accumulatetd by one set of totalizers and certain items printed by the other set of type may be accumulated upon the other set of totalizers.

25. In a calculating machine, the combination of columns of keys, two sets of totalizers, two series of type, a separate printing platen for each set of type, means to correlate one series of totalizers with both printing mechanisms, means to correlate one series of totalizers with only one of the printing mechanisms, means for variably positioning corresponding type of each series for printing purposes, mechanical means for causing substantially uniform impressions to be produced by said type when so positioned, and means whereby the items printed by said type may be accumulated upon said totalizers.

26. In a calculating machine, the combination of a casing, a series of columns of keys, two sets of totalizers, two series of printing devices, means whereby one set of totalizers can be correlated for operation with both printing devices, means whereby the other set of totalizers can be correlated with only one set of printing devices, means for positioning corresponding type of each series for printing purposes, spring actuated hammers for making an impression at each printing place, means whereby the items printed may be accumulated upon the totalizers, and mechanical means to effect said printing upon the operation of the machine.

27. In a calculating machine, a casing having an opening and a narrow slit therein, a plurality of columns of keys, two sets of totalizers, sets of type adjacent the opening and adjacent the slit in said casing, means to variably position said type subsequent to the operation of the keys, mechanical means for making uniform impressions from said type at each of said printing places, means whereby the items so printed may be accumulated upon said totalizers, and means whereby the totals on both sets of totalizers may be printed by one of said sets of type.

28. In a calculating machine, the combination of a casing, a plurality of keys carried thereby, two series of printing devices coördinated with the keys, means for variably controlling the movement of corresponding type of each series, resilient means for causing a single impression to be printed by each series at each printing place, and means whereby one of the printing devices can be prevented from making an impression.

29. In a calculating machine, a casing, a plurality of keys supported thereby, a series of totalizers therein, two series of type, means to position corresponding type of each series after the operation of the keys, mechanical means to cause said type to print items at each of said printing places, means to accumulate upon the totalizers the items printed by the type, means whereby the totals upon said totalizers may be printed by one of said sets of type, and means whereby one of the printing devices may be prevented from making an impression at will.

30. In a calculating machine, a casing, a plurality of keys supported thereby, a series of totalizers therein, two series of type, means to variably position said type after the operation of said keys, mechanical means for causing substantially uniform impressions to be made from said type at each of said printing place, means whereby the items printed by said type are accumulated upon said totalizers, means to cause one of said series of type to print the totals shown on said totalizers and means to prevent an impression from being made upon the other set of type when said total is to be printed, substantially as described.

31. In a calculating machine, a casing, a plurality of keys supported thereby, two series of totalizers therein, two sets of type correlated with the totalizers to print items thereon accumulated, mechanical means for producing substantially uniform impressions from said type at each of said printing places, means to cause one of said series of type to print totals, means to prevent the other series of type from printing when said totals are to be printed and means to prevent a sheet of material from being inserted into the casing of the machine at said printing place when totals are to be printed from the first set of type, substantially as described.

32. In a calculating machine, the combination of a casing, a plurality of keys supported thereby, a series of totalizers therein, two series of type correlated with the totalizers to print items thereon accumulated, means to cause one of said series of type to print totals and a shutter to prevent a sheet from being inserted into the casing of the machine adjacent the other set of type when totals are to be printed, substantially as described.

33. In a calculating machine, the combination of a casing, a plurality of keys supported thereby, two series of totalizers therein, means whereby either series of totalizers may be correlated with the keys, two series of type, means to cause each of said series of type to print items upon the operation of the machine when one of said totalizers is correlated with the operating mechanism and means to prevent one of said printing devices from being used for printing purposes when the other totalizer is correlated with the operating mechanism, as set forth.

34. In a calculating machine, the combination of a casing, a plurality of keys supported therein, two series of totalizers therein, two series of type, means whereby either series of totalizers may be correlated with the operating mechanism, means to cause each of said series of type to print items when one of said series of totalizers is correlated with the operating mechanism, means to prevent the use of one of said series of type when the other totalizer is correlated with the operating mechanism and means whereby the totals on either series of totalizers may be printed by the former series of type, substantially as described.

35. In a calculating machine, the combination of a casing, a plurality of keys supported therein, two series of totalizers therein, means whereby either series of totalizers may be correlated with the operating mechanism, two series of type correlated with the totalizers to print corresponding items accumulated upon one of the totalizers, means to accumulate upon the other totalizers items printed by one of said sets of type, means to prevent the use of the other set of type when that totalizer is in use and means whereby the first set of type may be caused to print the totals shown on each set of totalizers, at will, substantially as described.

36. In a calculating machine, the combination of a casing, a plurality of keys supported therein, two series of totalizers therein, means to correlate either of said series of totalizers with the operating mechanism, two series of type, means whereby the items printed by each of said series of type may be accumulated upon one of said series of totalizers before the printing operation has occurred and means whereby items printed by one of said series of type may be accumulated upon the other series of totalizers before the printing operation has occurred, substantially as described.

37. In a pass book printer, an adding machine, two series of totalizers therein, a set of type correlated with one of said series of totalizers to accumulate thereon the items printed by the type, a printing platen adjacent the type, means to cause said type to print selected items, other type for use with the other series of totalizers and means to cause said second set of type to print totals from either set of totalizers, substantially as described.

38. In a pass book printer, an adding machine having two series of totalizers, a pass book printing platen, type adjacent said platen, means correlated with one of said series of totalizers to accumulate the amounts printed upon said pass book and means to shift the mechanism from one to the other series of totalizers, substantially as described.

39. The combination in a calculating machine of series of accumulators shiftable into and out of operative positions, two series of type, means to position said type, means to fill in the zeros at the right of each type positioned at each printing place in a single operation and means whereby the type positioning mechanism may cause the operation of either accumulator unit, substantially as described.

40. The combination of a calculating machine having two series of totalizers, type correlated with the totalizers to print items accumulated on one of the totalizer series, a printing platen adjacent the type, means to cause the type to print selected items, means to operate the other set of totalizers with the machine and means to prevent an impression from being made from the type, substantially as described.

41. The combination of a calculating machine having two series of totalizers, two sets of type correlated with the totalizers to print items accumulated on one of the totalizer series, shifting mechanism to connect either totalizer with the operating mechanism, means to cause the type to print selected items, means to cause one series of the type to print totals from both totalizers and means to then prevent an impression from being made from the other type, substantially as described.

42. The combination of a calculating machine having two series of totalizers, type correlated with the totalizers to print items accumulated thereon, two printing platens adjacent the type, means to cause the type to print selected items and means to lock one platen out of use when one of the totalizers is out of use, substantially as described.

43. The combination of a casing having a series of totalizers, type correlated with the totalizers to print items accumulated thereon, two printing platens adjacent the type, means to cause the type to print selected items and a lock for one printing platen should it be desired not to operate the totalizers correlated with that set of type and platen, substantially as described.

44. The combination of a calculating machine having two series of totalizers, type correlated with the totalizers to print items accumulated thereon, two printing platens adjacent the type, means to cause the type to print selected items, means to shift the mechanism to operate either series of totalizers, a lock for one of said platens operated when one of said totalizers is moved out of use and a shutter to prevent the insertion of a sheet into the machine at that time, substantially as described.

45. The combination of a calculating machine having a series of totalizers, two sets of type correlated with the totalizers to print items thereon accumulated, a separate printing platen adjacent each set of type upon which the printing is accomplished, means to cause one of said sets of type to print totals from each totalizer, means whereby the printing impressions at each printing place are rendered substantially uniform and means to prevent impressions from being made from one set of type when the totals from both totalizers are to be printed, substantially as described.

46. The combination of a calculating machine having a series of totalizers, two sets of type correlated with the totalizers to print items thereon accumulated, stops for determining the type to be set, an operating lever, means to eliminate the zero at the left of all amounts printed by each of said type on the operation of said lever and means to cause said type to make a substantially uniform impression each time, substantially as described.

47. The combination of a series of keys, two series of totalizers, a plurality of printing devices operatively connected with said keys, means for positioning corresponding type of said plurality of printing devices according to the keys operated, means to operate either series of accumulators, mechanical means of producing substantially uniform impressions from said type as positioned in a plurality of separate places and means for causing the accumulation of the amounts printed, substantially as described.

48. The combination of two selective devices, two series of totalizers, a plurality of printing devices operatively connected with said selective devices, means for positioning corresponding type of said plurality of printing devices according to the operation of the selective devices, means to operate either series of accumulators, mechanical means of producing substantially uniform impressions from said type as positioned in a plurality of separate places, means to prevent the operation of one of the printing devices when one accumulator is used and means to cause the accumulation of the amounts printed, substantially as described.

49. The combination of a series of keys, two series of totalizers, a plurality of printing devices operatively connected with said keys, means for positioning corresponding type of said plurality of printing devices according to the keys operated, a platen adjacent each printing device, mechanical means of producing substantially uniform impressions from said type as positioned in a plurality of separate places and corresponding to the keys operated, means to operate either series of accumulators, means to lock one platen and to prevent the operation of the adjacent printing device when one totalizer series is used, substantially as described.

50. The combination of a series of keys, two series of totalizers, a plurality of printing devices operatively connected with said keys, means for positioning a plurality of type of said plurality of printing devices according to the keys operated and representing more than unit amounts, mechanical means of producing substantially uniform impressions from said type as positioned at substantially the same time in a plurality of separate places, means to cause the accumulation of the amounts printed and means to lock one of said sets of totalizers and printing devices out of use while leaving the other set accessible for general use, substantially as described.

51. The combination of a series of keys, two series of totalizers, a plurality of printing devices operatively connected with said keys, means for positioning corresponding type of said plurality of printing devices according to the keys operated and representing more than unit amounts, mechanical means of producing substantially uniform impressions from said type as positioned in a plurality of separate places corresponding to the keys actuated, means to cause the accumulation of the amounts printed, means to prevent the insertion of a sheet adjacent one printing device to lock that printing device and to lock one totalizer when the other totalizers are in use, substantially as described.

52. In a calculating machine, the combination of a casing, a plurality of keys supported therein, a series of totalizers, two series of type correlated with the totalizers, means to accumulate upon the totalizers the increment of movement of the operating mechanism after the setting of the keys, means for taking not to exceed one impression from each series of type upon each accumulation, and means to lock one series of type out of action at will, substantially as described.

53. In a calculating machine, the combination of a casing, a plurality of keys supported therein, a series of totalizers therein, two series of type correlated with the totalizers, means to accumulate upon the totalizers the increment of movement of the operating mechanism, means whereby but a single printing impression can be taken from the type upon each movement of the totalizers, and means to prevent the insertion of a slip to be printed upon when the printing operation is to take place, substantially as described.

54. In a calculating machine, the combination of a casing, a plurality of keys supported therein, a series of totalizers therein, two sets of type correlated with the totalizers, means to accumulate upon the totalizers the increment of movement of the operating mechanism after the setting of the keys, means to prevent the printing of more than one impression from each set of type upon each movement of the operating mechanism, and means to close the entrance to the casing adjacent one set of type to prevent the insertion of a second slip of paper at the time the printing operation is about to occur, substantially as described.

55. In a calculating machine, the combination of columns of keys, two sets of totalizers, printing devices correlated with the totalizers, means to accumulate upon the totalizers the items printed, means to prevent more than one impression from being taken from the printing devices upon each operation of the totalizers, and means to lock one of said printing devices out of use when its totalizer is not used, substantially as described.

56. In a calculating machine, the combination of columns of keys, two sets of totalizers, two sets of printing devices correlated with the totalizers, means to accumulate upon the totalizers the items printed, means whereby either set of totalizers may be correlated with the operating mechanism, means whereby not more than one impression may be taken from the printing devices with each movement of the machine, means to prevent the operation of one set of printing devices when its totalizer is not used, and means to prevent the insertion of a sheet of paper in the machine at that time, substantially as described.

In testimony whereof I have hereunto set my hand in the presence of two subscribing witnesses.

STUART F. SMITH.

Witnesses:
FRANCIS M. WRIGHT,
D. B. RICHARDS.

DISCLAIMER.

1,152,664.—*Stuart F. Smith*, San Francisco, Calif. COMPUTING AND RECORDING MACHINE. Patent dated September 7, 1915. Disclaimer filed July 23, 1926, by the assignee by mesne assignments, *The National Cash Register Company*.

Hereby enters this disclaimer to that part of the claims in said specification which are in the following words, to wit:

"6. The combination of a casing, a series of columns of numeral keys, a corresponding series of type carrying means within the casing, a plurality of sets of type carried by each of said means, means variably limited by the depression of the several keys of the columns for simultaneously moving a plurality of type carrying means of both series into position to print, the casing being so formed as to permit of the insertion of a sheet of paper into proximity with a line of type of one set, and so as to permit of a roll of paper being advanced to present a part thereof in proximity with the printing line of the other set, operating mechanism, and means, actuated in a continuous movement of the operating mechanism, for printing from both of said lines of type, substantially as described.

"7. The combination of a casing a series of columns of numeral keys, a corresponding series of type carrying means within the casing, a plurality of sets of type carried by each of said means, means variably limited by the depression of the several keys of the columns for simultaneously moving a plurality of type-carrying means of both series into position to print, the casing being so formed as to permit of the insertion of a sheet of paper into proximity with a line of type of one set, and so as to permit of a roll of paper being advanced to present a part thereof in proximity with the printing line of the other set, a series of totalizing wheels variably advanced with the movements of the corresponding type carriers of the two sets, operating mechanism, and means, actuated in a continuous movement of the operating mechanism, for printing from both of said lines of type, substantially as described.

"28. In a calculating machine, the combination of a casing, a plurality of keys carried thereby, two series of printing devices coordinated with the keys, means for variably controlling the movement of corresponding type of each series, resilient means for causing a single impression to be printed by each series at each printing place, and means whereby one of the printing devices can be prevented from making an impression.

"52. In a calculating machine, the combination of a casing, a plurality of keys supported therein, a series of totalizers, two series of type correlated with the totalizers, means to accumulate upon the totalizers the increment of movement of the operating mechanism after the setting of the keys, means for taking not to exceed one impression from each series of type upon each accumulation, and means to lock one series of type out of action at will, substantially as described."

[*Official Gazette August 24, 1926.*]